Patented Mar. 31, 1942

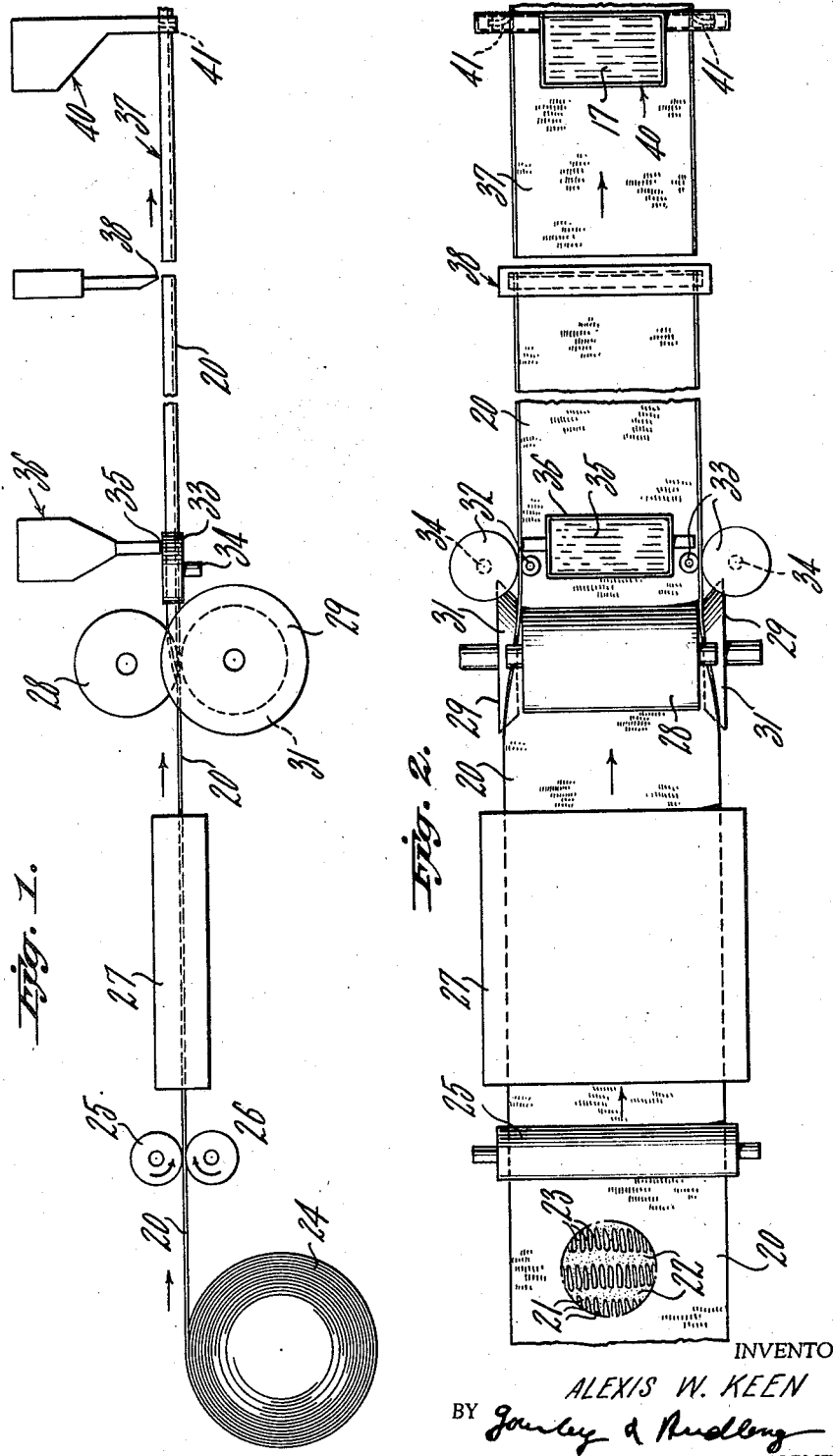

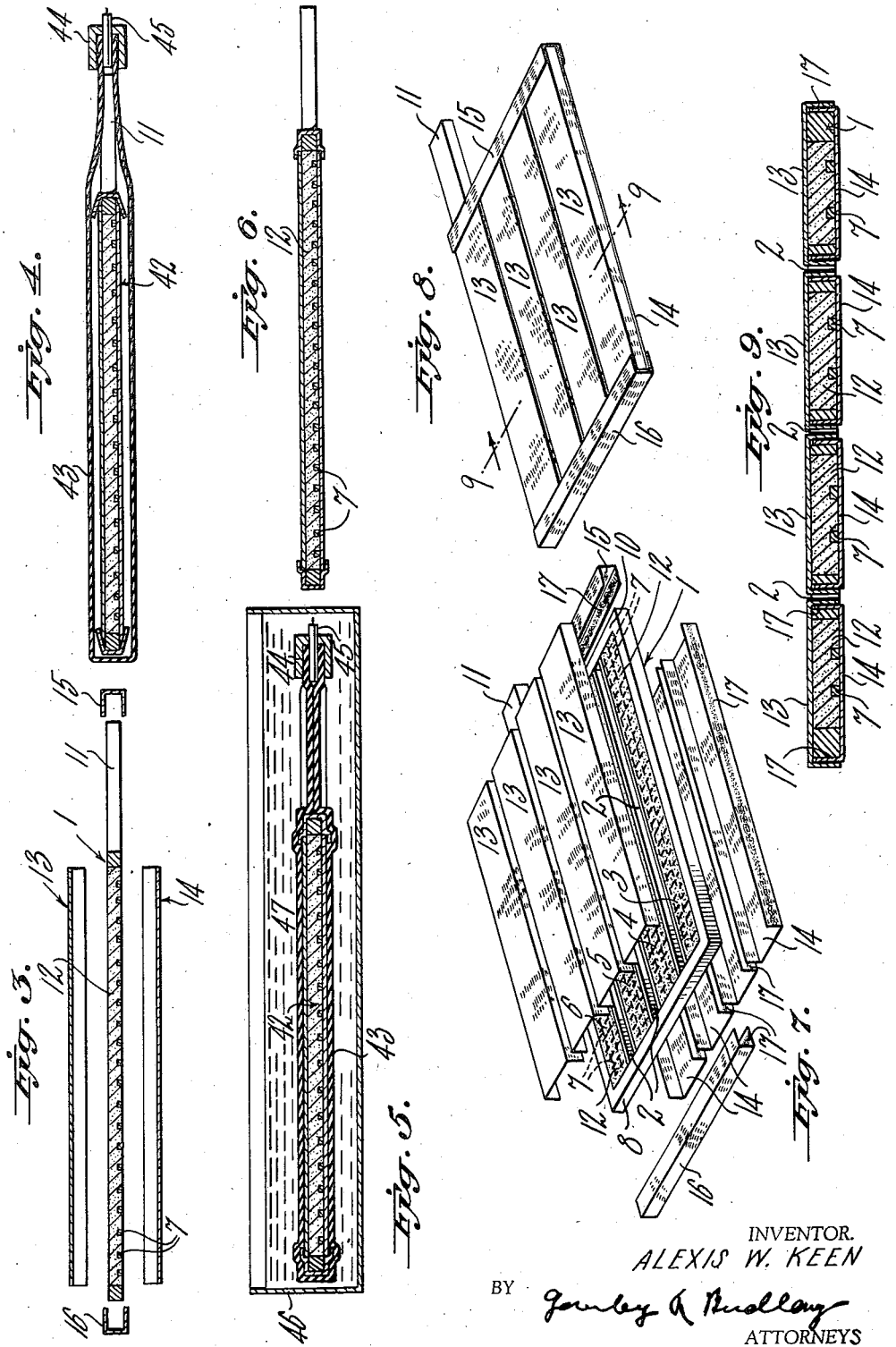

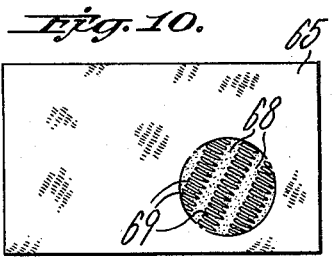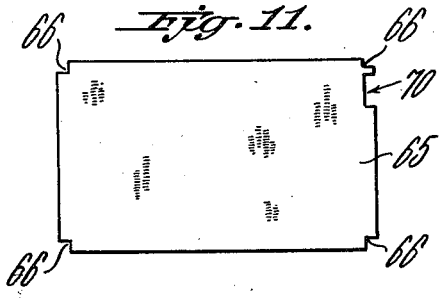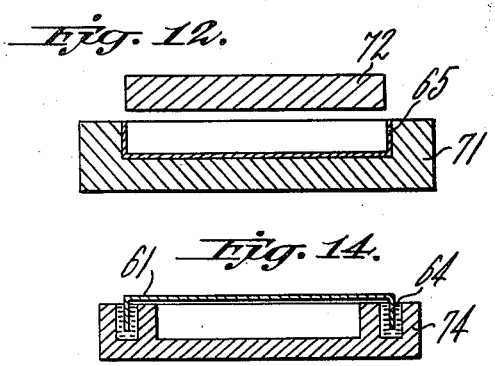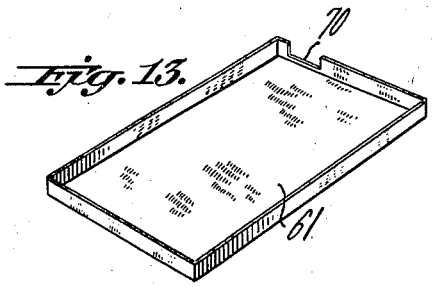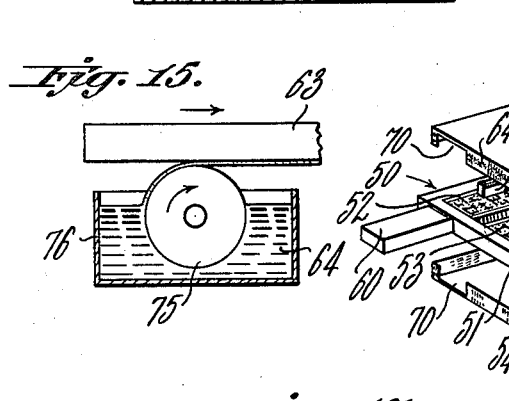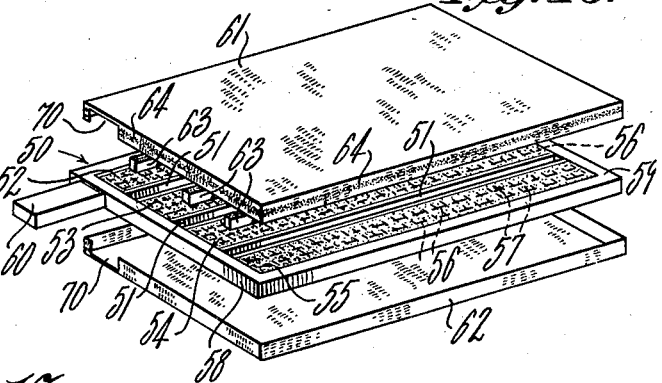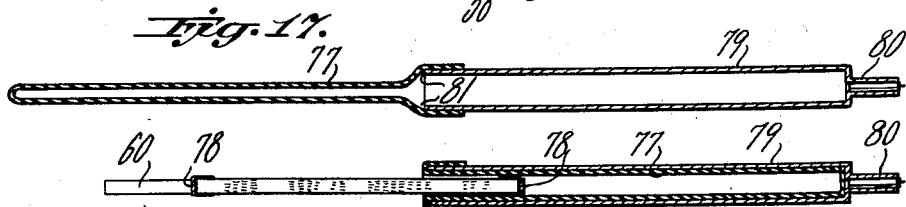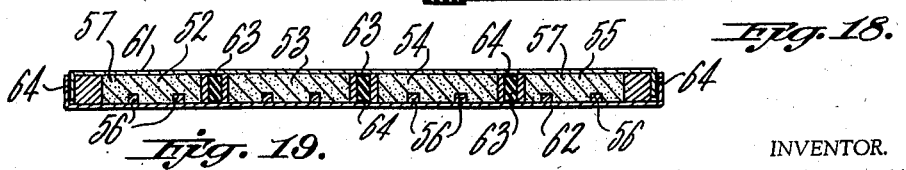

2,277,763

UNITED STATES PATENT OFFICE 2,277,763

METHOD OF MAKING BATTERY PASTE RETAINERS

Alexis W. Keen, Packanack Lake, N. J., assignor, by mesne assignments, to United States Rubber Company, New York, N. Y., a corporation of New Jersey Application October 21, 1937, Serial No. 170,224

12 Claims. (Cl. 136—176)

This invention relates to methods of making battery paste retainers, and more particularly to paste retaining envelopes for secondary or storage battery plates or grids, which are adapted to producing hold electro-chemically active paste material. This invention is especially useful when applied to the production of plates of storage batteries which are subjected to vibrations and to heavy charges and discharges of current.

Heavy duty storage batteries used under such conditions, as for example in railroad car and submarine service, require plates protected against dislodgement of the active material in order to give long service. Since the plates are composed of a light grid packed and covered with active electro-chemical paste, a protective retainer is necessary to prevent the paste from accumulating at the bottom of the plate. In order to retain the paste within the grid, it has been the practice to place thin perforated sheet material against opposite faces of the battery plate, particularly of the positive plate. Former methods of holding the sheet have relied generally on the pressure applied by strips of the sheet material inserted between the positive and negative grids. Alternatively, envelopes have been formed of the sheet material which loosely covers the battery plate, but such methods of holding the sheet in position do not guarantee its close contact with the paste, with the result that during the time of service the paste dislodges from the grids and by gravity gradually works its way between the grids and sheets to the bottom of the cells. This undesirable result is enhanced by the fact that a paste filled battery grid invariably has surface irregularities on its active faces. No matter how tightly the sheet material is mechanically pressed against the general contour of the pasted faces of the grid, unless it conforms to the surface irregularities in those faces, the paste, when vibrated, will gradually become displaced and after a period of time will accumulate in the gaps where the sheet is not in contact with the surface of the plate. This over-concentration of the active paste material toward the bottom of the plate has the cumulative deleterious effect of upsetting the proper distribution of paste on the grid and of causing short circuits, with the ultimate result of curtailing or ending the life of the battery itself.

The present invention provides methods of attaching perforated hard rubber sheet material to a pasted battery grid in such a manner that the material covers the grid, lies in contact with and conforms to the irregularities in the surface of the pasted grid, and secures the paste so that it will not become dislodged from its proper position even when in heavy duty service.

This invention may be employed to cover a battery plate having a solid mass of active paste, but it is preferred to use a plate having openings extending through it, so that the paste retainer sheet may be anchored at closer intervals than merely around the edges of the plate. Accordingly, a plurality of covering sections are shaped, treated with adhesive, and fitted together in loose assembly to surround the plate and to interlock with each other. The assembly is then inserted within a vacuum bag which is clamped closed and subjected to vacuum and heat. The heat and the differential pressure of the vacuum cause the thermoplastic retainer material to conform to the surface configurations of the pasted plate, while at the same time the adhesive sticks the sections together. The bag is then cooled and the final plate covered with the paste retaining envelope, is withdrawn.

The accompanying drawings illustrate two preferred methods of practicing the present invention, together with resultant embodiments of the finished plates produced thereby, in which:

Fig. 1 is a diagrammatic elevational view of an apparatus for preparing strips of sheet retainer material for application to a battery grid;

Fig. 2 is a plan view of the apparatus shown in Fig. 1, with a portion of the retainer sheet material enlarged;

Fig. 3 is a cross-sectional view of a battery grid and its paste retaining strips in position preparatory to being assembled;

Fig. 4 is a cross-sectional view of a battery grid with the parts shown in Fig. 3 assembled, and inserted in a vacuum bag closed by a clamp;

Fig. 5 is a cross-sectional view of the assembly in the closed bag with heat and vacuum applied;

Fig. 6 is a longitudinal cross-sectional view of the finished plate;

Fig. 7 is an exploded perspective view of the grid and paste retaining strips prior to assembly;

Fig. 8 is a perspective view of the finished plate;

Fig. 9 is a transverse cross-sectional view of the plate, taken on lines 9—9 of Fig. 8;

Fig. 10 is a plan view of a sheet of retainer material, with a portion enlarged, to be employed in a modification of the invention;

Fig. 11 is a plan view of a notched sheet preparatory to being molded into a half envelope;

Fig. 12 is a cross-sectional view of a mold for forming a half envelope of paste retaining material;

Fig. 13 is a perspective view of a half envelope;

Fig. 14 is a cross-sectional view of means for applying adhesive to the edges of a half envelope;

Fig. 15 is a cross-sectional view of an apparatus for applying adhesive to an anchoring strip of hard rubber;

Fig. 16 is an exploded perspective view of a battery grid and paste retaining parts preparatory to assembly according to the modification;

Fig. 17 is a cross sectional view of an apparatus for facilitating insertion of the assembled grid into a pressure bag;

Fig. 18 is a cross-sectional view of the assembled grid partly inserted into the bag; and Fig. 19 is a transverse cross-sectional view of the alternative finished plate according to this invention.

*Flanged strip retainer*

Figs. 1-9 inclusive illustrate an embodiment of the present invention in which sheet paste retainer material is formed and cut into longitudinally flanged strips and applied in sections around a battery grid. The assembled parts are then placed in a vacuum bag and subjected to heat and differential pressure.

Referring particularly to Figs. 7, 8 and 9, a battery unit produced according to this invention comprises a metallic plate 1 which is divided by longitudinal openings 2 into a plurality of open grid columns 3, 4, 5 and 6, each having an open grid 7. End pieces 8 and 10 connect these columns and a terminal 11 extends from end piece 10 beyond column 6.

The grids 7 in the columns 3, 4, 5 and 6 are packed with electro-chemically active paste material 12 which forms their exterior surfaces. Each column is covered by upper and lower telescoping flanged strips 13 and 14, respectively, of sheet retainer material, so that the flanges of each strip 14 fit over the edges of the columns and are overlapped by the flanges of a corresponding strip 13 to enclose the several columns as illustrated in Figs. 8 and 9. Flanged end strips 15 and 16 of retainer material are then placed over the ends of the strips 13 and 14 to complete the assembly, strip 15 having a slot (not illustrated) to accommodate the terminal 11. Adhesive 17 on the exterior faces of the flanges of strips 14 and on the interior faces of the flanges of end strips 15 and 16 hold the assembly in permanent relation after heat and vacuum have been applied as hereafter described.

The plate 1 is the usual lead grid filled with paste material 12 usually of a lead oxide composition. The adhesive 17 is preferably thermoplastic at temperatures which are not injurious to the lead or the paste material or the sheet retainer material.

The paste retainer material 20 may be a perforated thermoplastic sheet, for example, microporous structure of hard rubber, or preferably sheet material as disclosed in U. S. Patent No. 2,079,584 to Eardley Hazell et al., and as shown greatly enlarged in Fig. 2. This latter sheet, of a construction having a thickness of the order of .012 inch and elongated perforations 21 representing void spaces equal to 38% of the total area, is eminently suitable for battery paste retainer use. In such a construction the perforations 21 are defined by transverse relatively thick ribs 22 and interconnecting thin ribs 23 (Fig. 2) numbering respectively 13 and 55 to the inch.

Referring to Figs. 1 and 2, in the manufacture of strips 13 and 14, retainer sheet material 20, as exemplified by hard rubber, is supplied from a reel 24 between feed rolls 25 and 26 which actuate the sheet in the direction of the arrow through a heating element 27 which softens the thermoplastic hard rubber. The sheet then passes between upper roll 28 and lower flanging roll 29, opposite edges of the sheet being deformed by bevelled flanges 31 on the lower roll 29. Pairs of rolls 32 and 33, respectively, mounted on vertical shafts 34, engage the deformed edges of the sheet to produce flanges normal to the plane of the sheet. Cold water 35 is supplied from a source 36 to flow over the flanged sheet to cool the thermoplastic material and set the flanges. Strips 37 are punched by a blunt straight edge 38 into the proper lengths. Certain of the strips 37 are then moved past a feeding supply 40 of adhesive 17 so that nozzles 41 apply the adhesive on a strip along the interior or exterior faces, as desired, of the flanges on each side of sheet retainer strip 37. The adhesive is then allowed to dry.

End retainer strips 15 and 16 may be similarly formed and cut to the proper size by predetermining the width of the reel 24 and length of upper roll 28 and the cylindrical portion of lower flanging roll 29. Adhesive is thus applied to the inner faces of the flanges of these strips, 15 and 16, as above described. The overlapping strips 13 are not applied with adhesive. The parts comprising the battery paste retainer are then in condition to be permanently applied to the plate 1.

As shown in Figs. 3 and 7, the upper strips 13 and lower strips 14, together with the end strips 15 and 16, are in position to be assembled and fitted around the plate. The fitted assembly 42 of positioned elements is inserted into a suction bag 43, and a clamp 44 having a tube and valve 45 is fitted over the open end of the bag to completely enclose the assembly, as shown in Fig. 4. The bag 43 is of air-tight flexible material, preferably vulcanized soft rubber, so that when the air is withdrawn through the tube and valve 45 as shown in Fig. 5, the soft rubber by differential pressure tightly encloses the assembly. The assembly is then placed in a tank 46 of hot fluid 47 which supplies the necessary heat to render the sheet material thermoplastic.

This heat and differential pressure step in the process serves a four-fold function: first, it enables the softened thermoplastic sheet to be conformed by pressure to the irregularities in the surface of the paste filled plate 1. Secondly, it softens the adhesive to make it adhere the flanges to the strips abutting them. Thirdly, it presses the adhesive so that it flows into the perforations 21 of the sheet to rivet the strips together, and fourthly, the heat and vacuum evaporate any surplus solvent remaining in the adhesive after drying.

The bag is then withdrawn from the hot fluid and placed in a container of cold fluid, similar to the container 46, in order to set the sheet material and the adhesive permanently. The clamp 44 is then detached and the finished plate as shown in Figs. 6, 8 and 9 is withdrawn. The plate 1 now has a permanent coating of hard rubber 20 which conforms throughout to the surface configurations and irregularities of the columns 3, 4, 5 and 6. Due to the extreme thinness of the hard rubber, the retainer covering appears unitary and almost without ridges where the flanges overlap. The openings 2 may be of a width approximately 4 times the thickness of the sheet material, in which case the flanges will completely fill the slots and the finished cover will not noticeably reveal the presence of the slots.

Half envelope retainer

Figs. 10 to 19, inclusive, illustrate an alternative embodiment of the invention in which a battery plate is covered with two interlocking half envelopes secured by anchoring strips inserted into slots in the plate, and subjected to heat and differential pressure similarly to the method heretofore described.

Referring particularly to Figs. 16 and 19, a battery plate 50 is divided by longitudinal slots 51 into columns 52, 53, 54 and 55, each column having a grid section 56 which is packed with chemically active paste material 57. The columns, as in the plate previously described, are connected at each end by end pieces 58 and 59, and a terminal 60 extends outwardly beyond column 52. Upper and lower molded half envelopes 61 and 62 are respectively placed above and below the plate so that the edge portions of the lower half envelope 62 overlap those of the upper half envelope 61. Anchoring strips 63, preferably of vulcanized hard rubber, fit into the slots 51 so that their exposed edges lie in the plane of the outer surface of the paste material 57. These outer edges of the anchoring strips, together with the outer faces of the edge portions of the upper half envelope 61, are provided with adhesive 64 which retains the assembly in permanent and practically unitary relationship.

Figs. 10 to 13 illustrate the manufacture of a half envelope such as 61 or 62 from a rectangular sheet 65 of perforated paste retaining material, similar to the sheet material 20. It is preferable, though not necessary, that the thicker ribs 68 and the thinner ribs 69 extend obliquely to the edges of the sheet 65. The corners are indented as at 66 and a gap 70 is cut at one edge of the sheet in order to accommodate the terminal 61. As shown in Fig. 12, the sheet 65 is placed in a mold 71 which has a cooperating member 72, either or both of which may be heated, and the mold is closed to turn up the edges of the sheet to form the finished half envelope 61, illustrated in Fig. 13.

Fig. 14 shows the application of adhesive 64 to the half envelope 61 by inverting it and dipping its edges into a container 74 of the adhesive. As shown in Fig. 15, the upper and lower edges of the anchoring strips 63 are successively drawn over a roll 75 which revolves partially submerged in a container 76 of adhesive 64. After application the adhesive is dried.

The plate 50 is then assembled loosely with the anchor strips 63 and the envelope halves 61 and 62, preparatory to insertion in a vacuum bag 77. When a flat bag is employed it is desirable to surround the outer edges of the assembly with a flat rigid frame 78 in order to prevent the formation of ridges on those edges, as illustrated in Fig. 18.

This assembly may be placed in a vacuum bag 77 in the manner previously described or an alternative bag insertion means may be employed. It is desirable that the bag, even when no suction is applied, should fit tightly around the assembly in order to obviate the formation of creases in the surface thereof after the vacuum has been applied.

Figs. 17 and 18 illustrate an apparatus for inserting the assembly into such a close fitting bag 77. A rigid container 79, having interior dimensions slightly greater than the dimensions of the assembly plus the thickness of the bag 77 and of the frame 78, is provided with a tube and valve 80 at its closed end, while the other end 81 is left open. The open end of the bag 77 is stretched a short distance over the open end 81 of the container 79 and a vacuum is applied through tube and valve 80 causing the remainder of the bag 77 to be drawn into the interior of the container so that its sides are held firmly by differential pressure against the interior wall of the container. The vulcanized rubber bag 77 thus stretched is in an extended position which will allow the insertion of the assembly. This method of inserting the assembly into the bag may be successfully employed with either embodiment of this invention. The vacuum is then released and the overlapping edges of the bag unfolded from around the end 81 of the container after which the bag containing the assembly may be removed from the container and a clamp applied.

The final pressure and heat application steps in the process are then performed, in the same fashion as heretofore described and illustrated in Fig. 5. A transverse cross-section of the finished battery plate having continuous sheets applied closely and permanently to its opposite faces is illustrated in Fig. 19. The adhesion of the insertion strips 63 along their entire length to the interior faces of the half envelope sheets 61 and 62 respectively, together with the adhesion of the flanges thereof, serves to provide adequate reinforcement against disassembly of the retainer material from the active paste material and from the battery plate.

The present battery paste retainer may be applied out of direct contact with the paste, as, for example, around an intermediate covering of glass wool or other protective material. The pressure fit of the retainer holds the glass wool tightly against the paste throughout the contacting surface.

The process, according to either preferred embodiment of the invention, is practically continuous, since none of the apparatus is in use for any considerable length of time. For instance, the suction bag containing the loose assembly of parts need be inserted in hot water for only two minutes, and in cold water for one minute. The bag may then be removed and is ready to accommodate another unfinished assembly, and so on. Any number of closed bags may be heated at the same time, depending on the size of the water tanks into which they are immersed.

Another advantage of the present invention lies in the use of hard rubber sheet material which has already been vulcanized and is in its finished condition when applied to the battery plate. A moderate degree of heat of the order of 200° F. is sufficient to be applied, so that no vulcanization takes place between the soft rubber bag and the hard rubber sheet. The avoidance of excessive temperatures also eliminates danger of damage to the soft metal plate and the paste material.

Accordingly a battery plate entirely enclosed, except for the terminal, within paste retainer sheet material, is produced. The paste is permanently held in position, even when subjected to excessive vibration, by the retainer material which closely conforms to all the irregularities in the surface of the pasted grid.

While certain present preferred embodiments of methods of practicing the invention have been shown and described, it is to be understood that other embodiments may be made therein without departing from the spirit thereof and the scope of the appended claims.

Having thus described my invention what I claim and desire to protect by Letters Patent is:

1. The method of making a protected battery plate which comprises packing a battery grid with electro-chemically active paste, surrounding the packed grid with a covering of perforated vulcanized hard rubber composition, placing the assembly in a flexible air tight bag, exhausting the air from said bag, and applying heat thereto.

2. The method of making a protected battery plate which comprises packing a battery grid with electro-chemically active paste, surrounding the packed grid with a covering of perforated thermoplastic material, placing the assembly in a flexible air tight bag, exhausting the air from said bag, and applying heat thereto.

3. The method of closely covering a pasted battery grid with paste retaining material of vulcanized hard rubber composition, which comprises applying adhesive to portions of said material which upon being wrapped are to lie contiguously to other portions thereof, wrapping said material around said grid, placing the wrapped grid into an air tight flexible bag, and subjecting the interior of the bag to vacuum and to heat.

4. In the method of attaching battery paste retainer material closely to a battery grid, the steps comprising stretching the open end of a vacuum bag around the open end of a rigid container of slightly larger internal dimensions than the external dimensions of its bag, withdrawing the air from said container so that the walls of the bag are drawn into the container and lie against the walls of the container, inserting a battery plate covered with paste retainer material into said bag, detaching the open end of the bag from the container, clamping the open end of the bag, and subjecting the interior of the bag to a vacuum.

5. The method of covering a pasted battery grid having irregularities on its surface which comprises surrounding the grid with perforated vulcanized hard rubber composition, placing the assembly in a flexible air tight bag, withdrawing the air from the bag, and subjecting the assembly enclosed in the bag to heat, whereby the rubber composition conforms to and follows the irregularities in the surface of the grid.

6. The method of attaching paste retaining material to a battery grid which comprises applying retaining material around the sides of said grid so that the edges of said material overlap, certain of said overlapping edges having adhesive on them, placing the assembly in a flexible air tight bag, withdrawing the air from said bag, and heating the bag enclosing the assembly, whereby said edges are permanently adhered together and said material conforms to the surface configurations of the sides of said grid.

7. The method of applying paste retaining material of vulcanized hard rubber composition to a pasted battery grid having slots extending therethrough which comprises inserting vulcanized hard rubber strips having adhesive applied to their outer edges into said slots, surrounding the grid with perforated vulcanized hard rubber material having overlapping flanges with adhesive applied thereupon, placing the assembly in an air tight flexible bag, withdrawing the air from the bag enclosing the assembly, and applying heat thereto, whereby the parts of the paste retaining material are closely and firmly attached to said grid and to each other.

8. In the method of attaching thermoplastic paste retaining material to a battery grid, the steps which comprise placing the assembly of a grid covered with thermoplastic paste retaining material into a flexible air tight bag, withdrawing air from the bag, and heating the bag enclosing the assembly, whereby the thermoplastic paste retaining material is made to conform to the surface configurations of the grid.

9. The method of attaching a covering of paste retaining material to a pasted battery grid having columns defined by longitudinal slots, which comprises fitting an upper flanged strip of said material over each column, applying adhesive to the flanges of co-operating flanged strips, fitting said co-operating flanged strips under each column so that the adhesive is between co-operating flanges, placing the assembly into a flexible air tight bag, withdrawing the air from the bag, and heating the bag enclosing the assembly, whereby said adhesive holds said strips together and said covering closely conforms to the surface configurations of said grid.

10. The method of making a protected battery plate which comprises packing a battery grid with electrochemically active paste, surrounding the packed grid with a covering of perforated hard rubber composition, placing the assembly in a flexible air tight bag, exhausting the air from said bag, and applying heat thereto.

11. The method of closely covering a pasted battery grid with paste retaining material of hard rubber composition, which comprises applying adhesive to portions of said material which upon being wrapped are to lie contiguously to other portions thereof, wrapping said material around said grid, placing the wrapped grid into an air tight flexible bag, and subjecting the interior of the bag to vacuum and to heat.

12. The method of applying paste retaining material of hard rubber composition to a pasted battery grid having slots extending therethrough which comprises inserting rubber strips having adhesive applied to their outer edges into said slots, surrounding the grid with perforated hard rubber material having overlapping flanges with adhesive applied thereupon, placing the assembly in an air tight flexible bag, withdrawing the air from the bag enclosing the assembly, and applying heat thereto, whereby the parts of the paste retaining material are closely and firmly attached to said grid and to each other.

ALEXIS W. KEEN.